T. J. QUIRK.
GUARD OR PROTECTOR FOR LOCOMOTIVE CABS, &c.
APPLICATION FILED FEB. 15, 1911.

1,004,077.

Patented Sept. 26, 1911.

2 SHEETS—SHEET 1.

Witnesses:—
Alfred Borkenhagen
Richard Sommer

Inventor
Thomas J. Quirk
by Geyer & Popp
Attorneys.

T. J. QUIRK.
GUARD OR PROTECTOR FOR LOCOMOTIVE CABS, &c.
APPLICATION FILED FEB. 15, 1911.

1,004,077.

Patented Sept. 26, 1911.

2 SHEETS—SHEET 2.

Witnesses:—
Alfred Bakenhagen.
Richard Sommer.

Inventor
Thomas J. Quirk
by Geyer & Popp
Attorneys.

COLUMBIA PLANOGRAPH CO., WASHINGTON, D. C.

UNITED STATES PATENT OFFICE.

THOMAS J. QUIRK, OF BUFFALO, NEW YORK.

GUARD OR PROTECTOR FOR LOCOMOTIVE-CABS, &c.

1,004,077.  Specification of Letters Patent.  Patented Sept. 26, 1911.

Application filed February 15, 1911. Serial No. 608,685.

*To all whom it may concern:*

Be it known that I, THOMAS J. QUIRK, a citizen of the United States, residing at Buffalo, in the county of Erie and State of New York, have invented new and useful Improvements in Guards or Protectors for Locomotive-Cabs, &c., of which the following is a specification.

The object of this invention is to provide an improved guard or protector for locomotive cabs, street cars, automobiles and similar structures for permitting the engineer or motorman to obtain a clear view ahead at all times and protect his eyes from wind, rain, snow, sleet, insects and other objects in the air which injure the eyes and tend to obscure the view ahead.

This invention has the further object to provide an improved guard of this character which prevents the reflection of light inside of the cab or vestibule of the locomotive cab or similar vehicles from interfering with the view ahead and also prevents dirt or dust from accumulating on the front window of the cab as is the case on windows of locomotives or motors that run through subways and tunnels.

A guard or protector of this character is shown in Letters Patent of the United States No. 919,379, granted to myself April 27, 1909, and the present invention is an improvement on the device shown in this patent.

Figure 1:
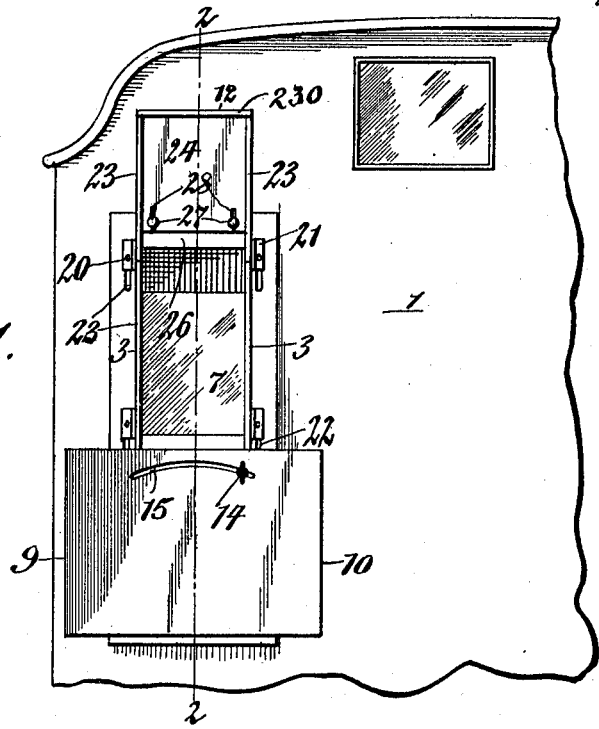
Figure 2:
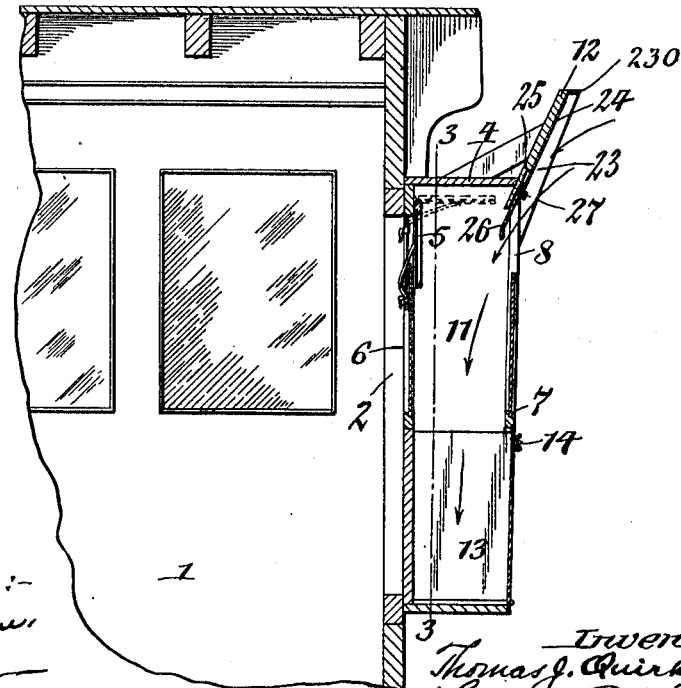
Figure 3:
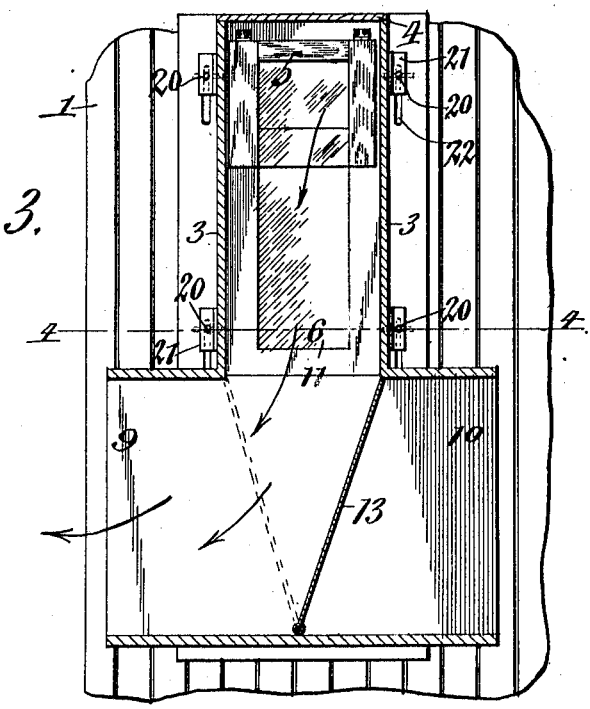
Figure 4:
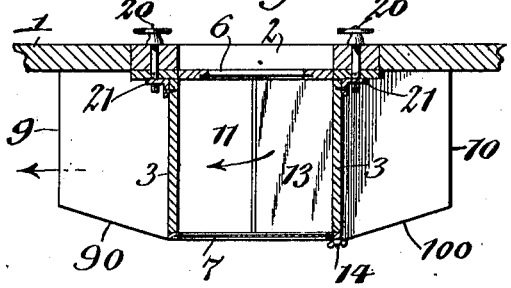
Figure 5:
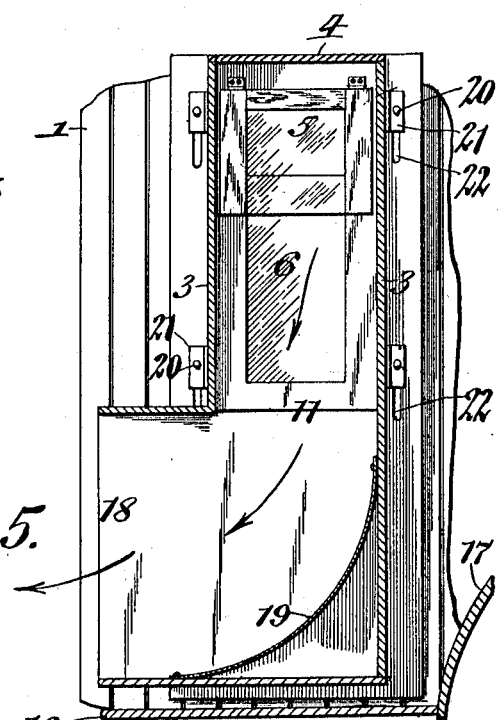

In the accompanying drawings consisting of 2 sheets: Figure 1 is a fragmentary front elevation of a street car equipped with my improved guard or protector. Fig. 2 is a vertical longitudinal section thereof in line 2—2, Fig. 1. Fig. 3 is a vertical transverse section, on an enlarged scale, in line 3—3, Fig. 2. Fig. 4 is a horizontal section in line 4—4, Fig. 3. Fig. 5 is a vertical transverse section similar to Fig. 3 but showing a construction of my improved guard or protector suitable for use on locomotive cabs.

Similar letters of reference indicate corresponding parts throughout the several views.

1 represents a compartment which may be either the cab of a locomotive, street car, automobile or other structure and in which is stationed the engineer, motorman or other attendant whose duties require him to look forward through an observation opening 2 in the front wall of the compartment and observe the condition of the roadway or view ahead. When applied to a street car or similar structure the guard or protector is so organized that it can be set according to whichever direction the wind is blowing and thus enable a clear view ahead to be maintained regardless of the direction of the wind. The form of guard suited for use on street cars or similar structures on which there is a clear space on opposite sides of the guard, is shown in Figs. 1–4 and constructed as follows: Arranged in front of the observation opening of the operator's compartment is a casing having two upright longitudinal walls 3, 3 arranged on opposite sides of the observation opening of the cab, a horizontal top 4 connecting the upper ends of the side walls, upper and lower rear sashes 5, 6 containing glass panes and forming the rear wall of this casing, a lower front sash 7 containing a glass pane and connecting the front walls along the lower parts of their front edges so as to form an upper wind inlet and sight opening 8 between the upper edge of this sash and the top of the casing and two lower outlets 9, 10 arranged horizontally and transversely in line and having their inner ends connected with the lower end of the vertical passageway 11 formed within the casing, said outlets extending laterally in opposite directions from this passageway.

The lower rear sash 6 of the casing is preferably fixed but the upper section 5 is hinged at its upper edge to the adjacent part of the casing so that it can be swung downwardly into a vertical position for closing the sight opening, as shown in full lines in Fig. 2, or the same may be swung upwardly into a horizontal position, as shown by dotted lines in Fig. 2, for uncovering the observation opening in the cab.

Above the inlet opening of the protector casing the same is provided with an inclined deflector 12 which causes the wind, rain or snow to be directed downwardly through the inlet and passageway of the casing and thereby prevent the same from striking the eyes of the attendant. At the lower end of this passageway the wind, rain or snow is discharged laterally therefrom in one direction or the other depending upon whichever way the wind is blowing. In practice the outlet toward windward is closed so as to prevent the wind from blowing upwardly through the protector while the outlet toward leeward is opened so as to permit the air to escape from the lower end of the protector without interference and also increase the suction downwardly through the passageway of the protector by reason of the movement of the wind past the active outlet of this passage. In order to increase the suction effect of the wind on the outlets of the casing the front sides or walls of these outlets are beveled or inclined from their inner to their outer ends, as shown at 9⁰, 10⁰, Fig. 4, whereby the wind as it strikes either outlet is deflected laterally in the direction of the outflowing air in the respective outlet and facilitates the exhaust of the same. In order to permit of discharging the air, rain or snow laterally at either side of the protector in accordance with the direction of the wind a controlling device is provided which preferably comprises a gate 13 arranged within the passageway between the outlets thereof and pivoted at its lower end to swing in a vertical plane transversely of the protector so that either one or the other of these outlets may be connected with the passageway and the other disconnected therefrom. As shown in full lines in Fig. 3, the gate is swung toward the right in which case the right hand outlet is cut off and the wind, rain or snow passing downwardly through the passageway in the protecting casing escapes laterally to the left hand outlet. Upon shifting the gate in the opposite direction into the position shown by dotted lines in Fig. 3, the left hand outlet is closed or disconnected from the passageway and the right hand outlet opened or connected with the same. The gate may be shifted into one or the other of these positions and held in place by various means, those shown in the drawings being suitable for this purpose and consisting of a clamping bolt 14 arranged at the front edge of the gate and extending through a curved slot 15 in the front wall of the passageway which slot is curved concentrically with the pivot of the gate.

When the protector is used on the front side of a locomotive cab where it is permanently arranged above the running board 16 and on one side of the boiler jacket 17 it is only possible to deliver the air from the passageway in one direction and when thus installed the lower end of the passageway is provided with but a single outlet 18 which projects laterally from the lower end thereof in but one direction, as shown in Fig. 5. In such a construction a curved guide 19 is preferably arranged at the outer corner of the turn between the passageway and lateral outlet so as to facilitate the movement of the air through the outlet. By employing a protector having such a laterally projecting outlet on a locomotive cab above the running board thereof this outlet is prevented from becoming blocked or clogged by the accumulation of snow or ice on the running board as is liable to occur when the outlet at the lower end of the passageway opens downwardly toward the running board.

It is desirable that the inlet opening of the protector casing be horizontally in line with the eyes of the engineer or attendant who is seated within the cab in order to enable him to get a clear view ahead without inconvenience. Inasmuch as the location of the eyes of engineers varies in a vertical direction depending upon the height of the person from the seat to the eyes, means are provided for shifting or adjusting the protector vertically. The means for this purpose preferably consists of a plurality of clamping bolts or screws 20 connected with brackets 21 on opposite side walls of the protector casing and arranged in vertical slots 22 in the front wall of the cab. When these clamping bolts are loose the protector may be raised or lowered to such a position as will bring the inlet opening of the casing in line with the eyes of the engineer after which the protector may be held in this position by tightening the clamping bolts 20.

In order to compel the wind to be directed most effectively by the deflector into the inlet opening and downwardly and outwardly through the protector this deflector is provided on its opposite vertical edges with vertical guide flanges or rails 23 which project forwardly therefrom. As the wind strikes this deflector these guide flanges prevent the wind from sliding off sidewise therefrom and confine the same on the deflector which causes the latter to effectively direct the same downwardly through the passageway of the protector. The deflector is also provided at its upper edge with a forwardly projecting horizontal transverse flange or rail 230 which prevents the wind upon striking the deflector from slipping upwardly over the upper edge thereof and compelling the wind to move downwardly through the passageway of the casing.

For the purpose of permitting of varying the size of the inlet opening 8 and also the length of the deflecting surface of the deflector the following means are provided: 24 represents a plate or facing of sheet metal which is secured to the front side of the deflector and preferably formed in one piece with the guide flanges 23. At its lower end this protecting plate is separated from the adjacent lower part of the deflector by an intervening space or pocket 25 in which is seated a vertically adjustable shutter 26 which may be constructed of sheet or similar metal. This shutter is retained in its adjusted position by means of one or more clamping bolts 27 connected with the shutter and passing through upright slots 28 in the protecting plate. When the wind is strong the shutter 26 is raised inasmuch as the wind at this time is directed with considerable force downwardly through the passageway 11 and prevented from entering the cab while the upper sash 5 is open. But when the wind is light the shutter 26 is lowered so as to increase the deflecting effect of the deflector on the air and cause the latter to move downwardly through the passageway instead of entering the cab and injuring the eyes of the engineer.

I claim as my invention:

1. The combination with the body of a compartment having an observation opening, of a guard or closure arranged in front of said compartment and providing a vertical passage which has an inlet at the top of the guard, an inclined deflector arranged above the inlet, and upright guide flanges arranged at opposite vertical edges of said deflector.

2. The combination with the body of a compartment having an observation opening, of a guard or closure arranged in front of said compartment and providing a vertical passage which has an inlet at the top of the guard, an inclined deflector arranged above the inlet, upright guide flanges arranged at opposite vertical edges of said deflector, and a horizontal transverse guide flange projecting forwardly from the deflector at the upper edge thereof.

3. The combination with the body of a compartment having an observation opening, of a guard or closure arranged in front of said compartment and providing a vertical passage which has an inlet at the top of the guard, an inclined deflector arranged above the inlet, and a vertically adjustable extension or shutter arranged at the lower end of said deflector.

4. The combination with the body of a compartment having an observation opening, of a guard or closure arranged in front of said compartment and providing a vertical passage which has an inlet at the top of the guard, an inclined deflector arranged above the inlet, a metal facing arranged on the front side of said deflector and spaced at its lower end from the deflector to form an intervening pocket, and a vertically adjustable extension arranged in said pocket.

5. The combination with the body of a compartment having an observation opening, of a storm guard comprising a casing arranged in front of said compartment and providing a vertical passage which is arranged opposite said observation opening and which has a forwardly opening inlet at its upper end and a laterally opening outlet at its lower end and a deflector for directing the weather from the vertical passage to the lateral outlet.

6. The combination with the body of a compartment having an observation opening, of a storm guard comprising a casing arranged in front of said compartment and providing a vertical passage which is arranged opposite said observation opening and which has a forwardly opening inlet at its upper end and two outlets at its lower end which open laterally in opposite directions, and a movable gate whereby the upper part of said passageway may be connected with either of said outlets and cut off from the other outlet.

7. The combination with the body of a compartment having an observation opening of a storm guard comprising a casing arranged in front of said compartment and providing a vertical passage which is arranged opposite said observation opening and which has a forwardly opening inlet at its upper end and two outlets at its lower end which open laterally in opposite directions, a movable gate whereby the upper part of said passageway may be connected with either of said outlets and cut off from the other outlet, said gate being pivoted at its lower end to swing in a vertical plane, and means for holding said gate in its adjusted position comprising a clamping bolt connected with the upper part of said gate and working in a curved slot in the front wall of the guard.

Witness my hand this 11th day of February, 1911.

THOMAS J. QUIRK.

Witnesses:
 THEO. L. POPP,
 ANNA HEIGIS.

---

Copies of this patent may be obtained for five cents each, by addressing the "Commissioner of Patents, Washington, D. C."